UNITED STATES PATENT OFFICE.

CHARLES A. CATLIN, OF PROVIDENCE, RHODE ISLAND, ASSIGNOR TO THE RUMFORD CHEMICAL WORKS, OF SAME PLACE.

PHOSPHATED MEDICINAL REMEDY.

SPECIFICATION forming part of Letters Patent No. 242,599, dated June 7, 1881.

Application filed July 12, 1880. (Specimens.)

*To all whom it may concern:*

Be it known that I, CHARLES A. CATLIN, of the city and county of Providence, and State of Rhode Island, have invented certain new and useful Improved Phosphated Medicinal Remedies; and I do hereby declare that the following specification is a true, clear, and exact description thereof.

The value of phosphates as remedial agents is now generally established. The most convenient as well as the most acceptable form for their administration has been found to be in aqueous solution. In certain forms of dyspepsia acid phosphates are largely prescribed by the medical profession; but it has been observed that as heretofore administered they have a tendency to develop acidity of the stomach—a result in a great measure due to the increased activity that the presence of phosphates in the stomach gives to germs of fermentation. In fact, there is reason to believe that phosphate solutions as heretofore prepared are themselves frequently the source of these germs of fermentation. Again, in certain zymotic diseases acid phosphates are prescribed with marked beneficial results; but, in addition, sulphurous acid, either by itself in the form of an aqueous solution, or in the form of sulphites, from which it is readily liberated by the acids of the stomach, is required to be administered to the patient to destroy the germs of infection within the system incident to the zymotic disease.

The great desirability of a preparation of acid phosphate which should be neutral as to any tendency in itself to develop acidity of the stomach, and which should contain the useful properties required in the remedies usually administered in ailments of a zymotic type, has led me to the preparation of a new medicinal compound composed of sulphurous acid in combination with acid phosphates of lime, soda, potassa, magnesia, and iron in aqueous solution, preferably prepared according to the method described in the Letters Patent of Professor Horsford. In such phosphated solutions the presence of sulphurous acid destroys the germs of fermentation which may be present, and which would soon produce a mucous-like growth offensive to the eye and render the phosphate solution repulsive to the patient. It also prevents the development within the digestive organs of germs of fermentation, which would otherwise be stimulated by the action of the phosphate alone, while the compound, when administered in zymotic diseases, works the remedial effects due both to acid phosphates and to an antiseptic agent.

It is desirable that the sulphurous acid should not be present in so great quantity as to disagreeably affect the taste and odor of the compound. I have found that from one one-thousandth to one one-hundredth of one per cent. of such acid, when mixed with the acid-phosphate solution, is sufficient to accomplish all the useful results which I have mentioned without producing a disagreeable sulphurous taste or odor. I do not, however, limit myself to any specific quantity, but mean to include any medicinal compound composed of acid phosphates and sulphurous acid in aqueous solution.

I am aware that in connection with the preparation of disinfectants and fertilizers it has heretofore been proposed to decompose phosphates without liberating the phosphoric acid by treating said phosphates with sulphurous acid in lieu of sulphuric acid, as set forth in the American Journal of Pharmacy, A. D. 1872, page 30.

I am also aware that sulphurous acid has long been known and used as an effective antiseptic to preserve meats from decomposition and to arrest the fermentation of liquids, and that it has also been used as a medicinal agent. I do not therefore claim, broadly, the use of such acid for the analogous purpose of preventing the growth of living organisms in acid-phosphate solutions. I am not aware, however, that sulphurous acid has, before my invention, been used in combination with acid phosphates to form a medicinal compound wherein the specific deleterious effect of the phosphates upon the contents of the human stomach in developing germs of fermentation is neutralized by the action of the sulphurous acid without impairing the remedial value of the phosphates; neither am I aware that a medicinal compound has before been known which contained within itself the recuperative stimulus of acid phosphates and the antiseptic properties of sulphurous acid, the two constituents being antagonistic to each other in their influence upon germs of decomposition, but neutral to each other as to their medicinal properties.

What I claim as my invention, and desire to secure by Letters Patent, is—

A phosphated medicinal remedy composed of acid phosphate and sulphurous acid in aqueous solution, substantially as described.

CHAS. A. CATLIN.

Witnesses:
W. H. THURSTON,
I. KNIGHT.